(12) United States Patent
Lu et al.

(10) Patent No.: US 10,377,076 B2
(45) Date of Patent: Aug. 13, 2019

(54) SYSTEM AND METHOD FOR FOUR-DIMENSIONAL PRINTING OF CERAMIC ORIGAMI STRUCTURES

(71) Applicant: City University of Hong Kong, Kowloon (HK)

(72) Inventors: Jian Lu, Kowloon (HK); Guo Liu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/663,961

(22) Filed: Jul. 31, 2017

(65) Prior Publication Data

US 2019/0030783 A1    Jan. 31, 2019

(51) Int. Cl.
| | |
|---|---|
| *B29C 64/165* | (2017.01) |
| *B29C 53/02* | (2006.01) |
| *B29C 53/00* | (2006.01) |
| *B33Y 70/00* | (2015.01) |
| *B28B 1/00* | (2006.01) |
| *B28B 11/24* | (2006.01) |
| *C04B 35/56* | (2006.01) |
| *C04B 35/571* | (2006.01) |
| *C04B 35/622* | (2006.01) |
| *C04B 35/64* | (2006.01) |
| *B33Y 10/00* | (2015.01) |
| *B28B 11/00* | (2006.01) |
| *C04B 35/488* | (2006.01) |
| *C04B 38/00* | (2006.01) |
| *B29L 7/00* | (2006.01) |
| *B29K 83/00* | (2006.01) |
| *B29K 105/16* | (2006.01) |
| *B29K 509/02* | (2006.01) |
| *C04B 111/00* | (2006.01) |

(52) U.S. Cl.
CPC ............. *B29C 53/02* (2013.01); *B28B 1/001* (2013.01); *B28B 11/003* (2013.01); *B28B 11/243* (2013.01); *B29C 53/005* (2013.01); *B29C 64/165* (2017.08); *B33Y 10/00* (2014.12); *B33Y 70/00* (2014.12); *C04B 35/488* (2013.01); *C04B 35/5603* (2013.01); *C04B 35/571* (2013.01); *C04B 35/622* (2013.01); *C04B 35/62222* (2013.01); *C04B 35/64* (2013.01); *C04B 38/0006* (2013.01); *B29K 2083/00* (2013.01); *B29K 2105/16* (2013.01); *B29K 2509/02* (2013.01); *B29L 2007/00* (2013.01); *C04B 2111/0081* (2013.01); *C04B 2111/00129* (2013.01); *C04B 2111/00181* (2013.01); *C04B 2235/3244* (2013.01); *C04B 2235/3895* (2013.01); *C04B 2235/483* (2013.01); *C04B 2235/5454* (2013.01); *C04B 2235/6026* (2013.01); *C04B 2235/656* (2013.01); *C04B 2235/6581* (2013.01); *C04B 2235/77* (2013.01); *C04B 2235/94* (2013.01); *C04B 2235/96* (2013.01); *C04B 2235/9615* (2013.01)

(58) Field of Classification Search
CPC .................................................. B29C 64/165
See application file for complete search history.

(56) References Cited

FOREIGN PATENT DOCUMENTS

WO    2017078987    *    5/2017

* cited by examiner

*Primary Examiner* — Kuo Liang Peng
(74) *Attorney, Agent, or Firm* — Renner Kenner Greive Bobak Taylor & Weber (57) ABSTRACT

A system and method of constructing a 4D-printed ceramic object includes extruding inks including particles and polymeric ceramic precursors through a nozzle to deposit the inks on a heating plate, whereby a 3D-printed elastomeric object is formed on the heating plate, folding the 3D-printed elastomeric object into a complex structure to form a 4D-printed pre-strained elastomeric object, and converting the 4D-printed elastomeric object into the 4D-printed ceramic object.

18 Claims, 12 Drawing Sheets

SYSTEM AND METHOD FOR FOUR-DIMENSIONAL PRINTING OF CERAMIC ORIGAMI STRUCTURES

FIELD OF INVENTION

The present invention relates to the printing of ceramic structures. In particular, embodiments of the invention are directed to the printing of foldable objects using polymeric compounds. Particular embodiments of the origami are printed in a manner such that the folding of the objects occurs by virtue of the materials of the property.

BACKGROUND

In the present specification, it will be understood that the term "origami" refers to the process of folding thin sheets into Three-Dimensional (3D) objects.

In the context of manufacturing and 3D printing, reference to "origami" assembly, is reference to the process of causing a 3D-printed object to "fold" into a more complex shape.

Such folding may occur through capillary force, by use of a mechanical inductor, or by a shape memory mechanism inherent to the material from which the 3D-printed object is formed.

In colloquial language, origami-like 3D printed objects (i.e. objects that are able to move or transform over time by virtue of their inherent construction and/or use of materials) are generally fabricated by a process known as Four-Dimensional (4D) printing. Thus in the context of the present specification, it will be understood that any reference to a "4D printed object is a reference to an object that has been printed using a 3D printing technology, but that is able to transform over time due to inherent properties of the object. Correspondingly, 4D printing refers to a printing process whereby a 3D printing mechanism or methodology is employed, and in some instances, followed by a shape-morphing step, in a manner such that a 4D-printed object is produced.

As will be appreciated, 4D-printed objects and 4D printing technology may find application in a number fields including robotics, life science applications, and biomimetic 4D printing.

Polymer-Derived Ceramics (PDCs), prepared through thermolysis of polymeric ceramic precursors, exhibit remarkable properties of conventional ceramics such as high thermal stability, chemical resistance to oxidation and corrosion, in addition to mechanical resistance to tribology. The microstructures and properties of PDCs can be tuned through tailored polymer systems and thermolysis conditions.

The additive manufacturing of polymeric ceramic precursors is a state-of-the-art technology used to construct complicated ceramic architectures. However, silicone resins are not flexible enough to be curved after being fully crosslinked for polymer-to-ceramic transformation.

It is against this background that the present invention has been developed.

SUMMARY OF THE INVENTION

In one aspect, the present invention provides a method of constructing a 4D-printed ceramic object, the method comprising extruding inks including particles and polymeric ceramic precursors through a nozzle to deposit the inks on a heating plate, whereby a 3D-printed elastomeric object is formed on the heating plate, folding the 3D-printed elastomeric object into a complex structure to form a 4D-printed pre-strained elastomeric object, and converting the 4D-printed elastomeric object into the 4D-printed ceramic object.

In one embodiment, the particles are zirconium dioxide nanoparticles.

In one embodiment, the polymeric ceramic precursors are poly(dimethylsiloxane).

In one embodiment, the temperature of the heating plate is in the range of from about 30° C. to about 400° C.

In one embodiment, the folding of elastomeric object is achieved by metal wires.

In one embodiment, the polymer-to-ceramic transformation occurs via pyrolysis in a vacuum or under an inert atmosphere.

In one embodiment, the 4D-printed ceramic object has a mixed Gaussian curvature.

This mixed Gaussian curvature may be advantageous as the stretchability of the elastomer offers opportunities to building sophisticated structures.

In one embodiment, the 4D-printed ceramic object has a dimension of 100 μm or more.

In one embodiment, the inks are formed from a homogenous distribution of the particles in the polymeric ceramic precursors and wherein the weight percentage of the particles in the inks is in the range of from about 1% to about 90% and the weight percentage of the polymeric ceramic precursors in the inks is in the range of from about 10% to about 99%.

In one embodiment, the heating temperature of polymer-to-ceramic transformation is 400° C. to 2000° C.

In one embodiment, the polymer structures undergo limited and uniform shrinkage during the polymer-to-ceramic transformation and wherein the 4D-printed ceramic object has substantially the same shape as the 4D-printed elastomeric object.

In one embodiment, the particles are characterized by an average diameter of about 100 μm or less.

In one embodiment, the particles are uniformly distributed powders.

In one embodiment, the elastomer object is locally or partially heated in order to achieve the ceramic-organic structure.

In one embodiment, the folding of elastomeric object is achieved by use of at least one of metal wires, prestretch devices, metal plates, polymer wires, polymer plates, carbon wires, carbon plates, silicon wires, silicon plates, shape memory alloys and shape memory polymers.

In one embodiment, the polymeric ceramic precursors include at least one of polysiloxanes, polysilsesquioxanes, polycarbosiloxanes, polycarbosilanes, polysilylcarbodiimides, polysilsesquicarbodiimides, polysilazanes and polysilsesquiazanes.

In one embodiment, the particles include at least one of zirconium dioxide particles, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles and refractory materials.

BRIEF DESCRIPTION OF THE DRAWINGS

Notwithstanding any other forms which may fall within the scope of the present invention, a preferred embodiment will now be described, by way of example only, with reference to the accompanying drawings in which:

FIG. 12D is an illustration of an example geometric representation of the associated entries in Table 1.

DETAILED DESCRIPTION OF PREFERRED EMBODIMENTS

In the ensuing description, certain terms, once introduced, will be abbreviated for the sake of brevity and to improve readability. It will be understood that the use of such abbreviations should not be construed as being limiting or otherwise placing a "gloss" on the meanings of such terms beyond the meanings that would be placed on the terms when construed by a skilled addressee.

The present invention, in at least one embodiment, provides a method of constructing a 4D-printed ceramic object, the method comprising extruding inks comprising particles; and polymeric ceramic precursors, through a nozzle to deposit the inks on a heating plate, whereby a 3D-printed elastomeric object is formed on the heating plate, folding 3D-printed elastomeric object into complex origami or kirigami structures, whereby a 4D-printed pre-strained elastomeric object is formed; and converting the 4D-printed elastomeric object into the 4D-printed ceramic object, whereby a 4D-printed ceramic object is formed.

In more detail, the silicone rubber NanoComposites (NCs) utilised are $ZrO_2$ nanoparticles (NPs) reinforced with Poly(DiMethylSiloxane) (PDMS).

PDMS is a dominant elastomer in silicone systems and is useful as a ceramic precursor, while providing inherent flexibility to construct a material that is suitable for origami folding. Furthermore, the stretchability of PDMS allows for the creation of delicate origami structures with mixed Gaussian curvatures. The structure can have positive Gaussian curvatures, negative Gaussian curvatures, zero Gaussian curvature or combinations thereof.

In the example given with reference to the Figures, crystalline $ZrO_2$ NPs with a primary average size of 20-50 nm in diameter were incorporated into a PDMS matrix, forming a jammed network within the polymer matrix while serving as barriers to mass and heat transfer in the polymer matrix, to thereby eliminate shrinkage upon ceramization.

The polymer-to-ceramic transformation is preferably achieved by pyrolysis in inert atmosphere, oxidation in oxidative atmosphere or a combination of the techniques.

It will be understood that the particles (NPs) may also be calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles, other refractory materials or any combination of the particles listed above.

The particles, in the embodiment, are characterized by an average diameter of about 100 μm or less and may be uniformly or non-uniformly distributed powders or fibers or tubes or any other regular shapes or any other combination of the above.

Figure 1:
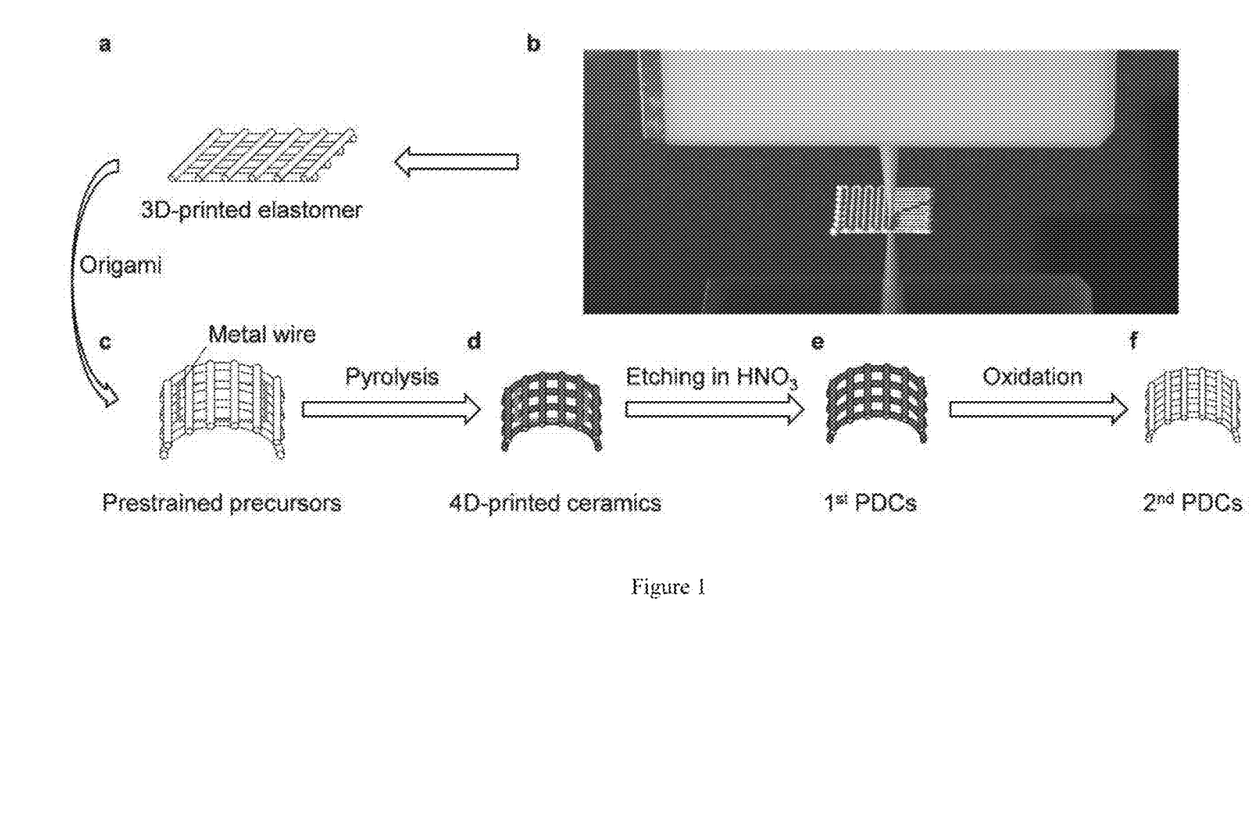
FIG. 1 illustrates the DIW-origami-SCOP method in accordance with an embodiment of the invention, wherein part a illustrates 3D-printed elastomeric lattices for origami; part b illustrates a schematic of the DIW method; part c illustrates the step of metal wire-assisted origami converting 3D-printed elastomer into pre-strained precursors; part d illustrates the step of pyrolysis converting pre-strained precursors into 4D-printed ceramics; part e illustrates the first PDCs obtained after etching of the metal wire; and part f illustrates the step of oxidation converting the first PDCs into second PDCs.

In the embodiment described herein, a known cost efficient 4D printing method is used. The method combines Direct Ink Writing (DIW) with synchronous thermal cross-linking of extruded pre-polymer inks, as shown in FIG. 1b. The inks are formed, in the embodiment, from a homogenous distribution of the particles in the polymeric ceramic precursors. In one preferred example, the weight percentage of the particles in the inks is in the range of from about 1% to about 90% and the weight percentage of the polymeric ceramic precursors in the inks is in the range of from about 10% to about 99%.

The heating plate is preferably in the range from about 30° C. to about 400° C.

3D-printed elastomer (see FIG. 1a), together with metal wire are prepared. While wires are used in the embodiment described herein, it will be understood that other pre-stretched devices may also be utilised. This can include metal plates, polymer wires, polymer plates, carbon wires, carbon plates, silicon wires, silicon plates, shape memory alloys, shape memory polymers or any combination of the above.

Taking the simplest folding as an example, the elastomeric ceramic precursors were buckled as a function of the pre-strain (see FIG. 1c).

It will be understood that the polymeric ceramic precursors may be polysiloxanes, polysilsesquioxanes, polycarbosiloxanes, polycarbosilanes, polysilylcarbodiimides, polysilsesquicarbodiimides, polysilazanes, polysilsesquiazanes or any combination of the above.

In addition, a method was developed to produce PDCs that have been termed "Synthetic Ceramics by Oxidation after Pyrolysis" (SCOP). This method converted PDMS NCs into SiOC matrix NCs (first PDCs) via pyrolysis in argon or under vacuum (see FIG. 1d), followed by oxidation in air, yielding second PDCs (see FIG. 10f).

The metal wire was etched in $HNO_3$ after the polymer-to-ceramic transformation (see FIG. 1e), and the chemical resistance of ceramics to corrosion guarantees structural stability during the process.

The first PDCs, as precursors of second PDCs, assisted in the formation of a dense SiOC framework. The dense framework allowed for the production of a 4D-printed ceramic origami with complex curvatures as shown in FIG. 1.

Figure 2:
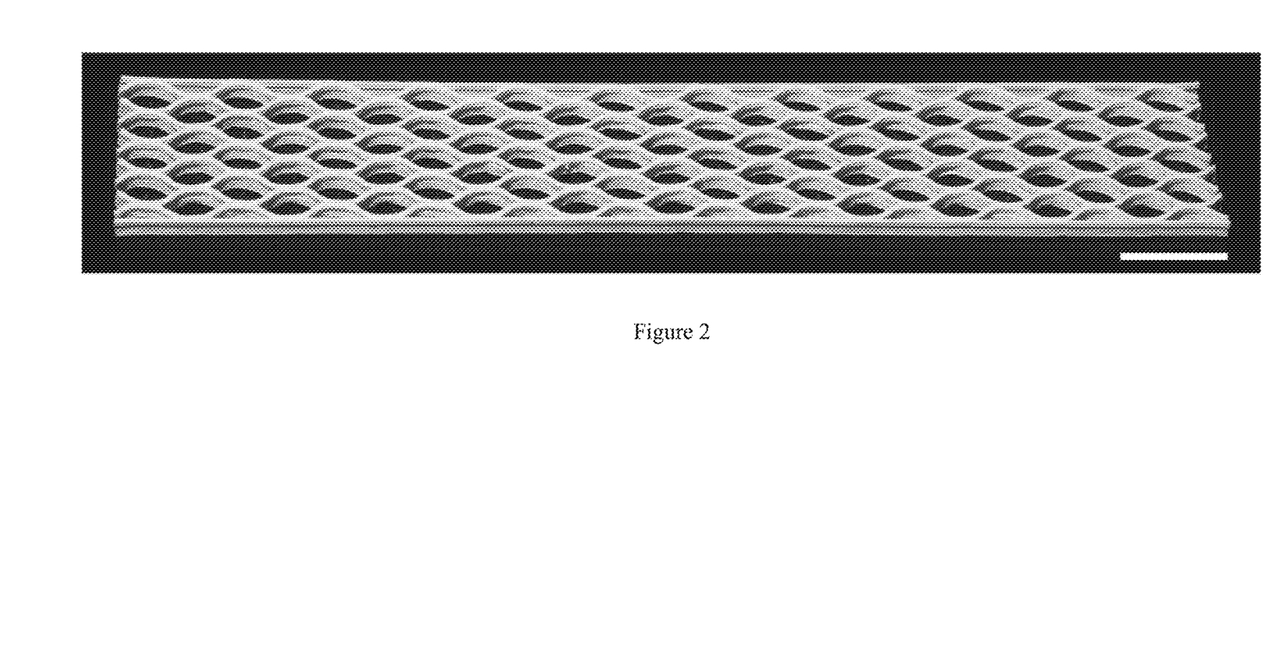
FIG. 2 shows an example of a 3D-printed large-scale elastomeric honeycomb.
Figure 3:
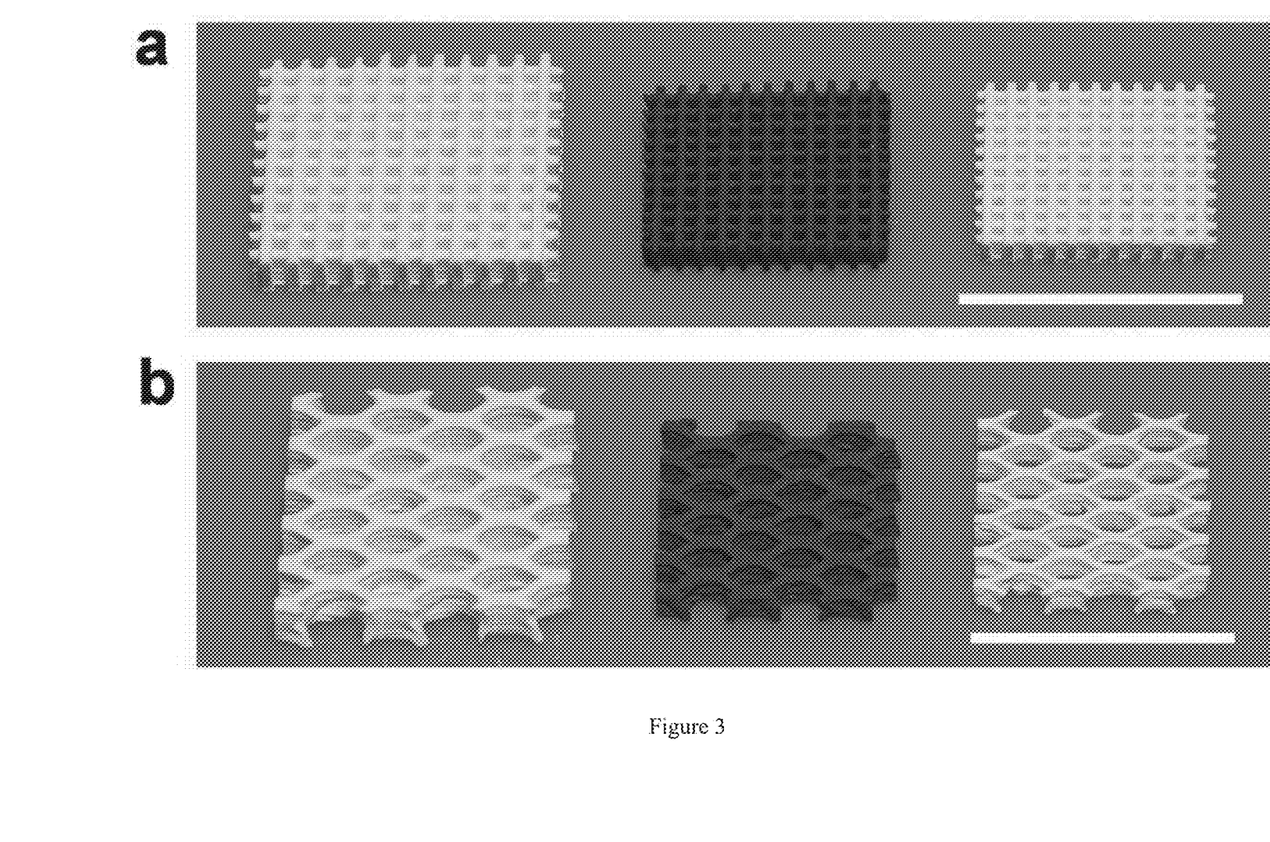
FIG. 3 shows an example of a 3D-printed microlattice (part (a)) and honeycomb (part (b)) of PDMS NCs, first PDCs and second PDCs (left to right)

Representative periodic structures, including lattices and honeycombs, are fabricated using the DIW-SCOP method described above. The scalability of the DIW method is demonstrated by the production of a large-area elastomeric honeycomb (FIG. 2). As can be seen from FIG. 3, isotropic shrinkage in the transformations causes good shape retention. Oxidation of the 1st PDCs at 1,000° C. is accompanied by a 2.4% mass loss and a 2.5% linear shrinkage, while 35% mass loss and 20% linear shrinkage occurring for pyrolysis of the PDMS NCs at 1,000° C.

Figure 4:
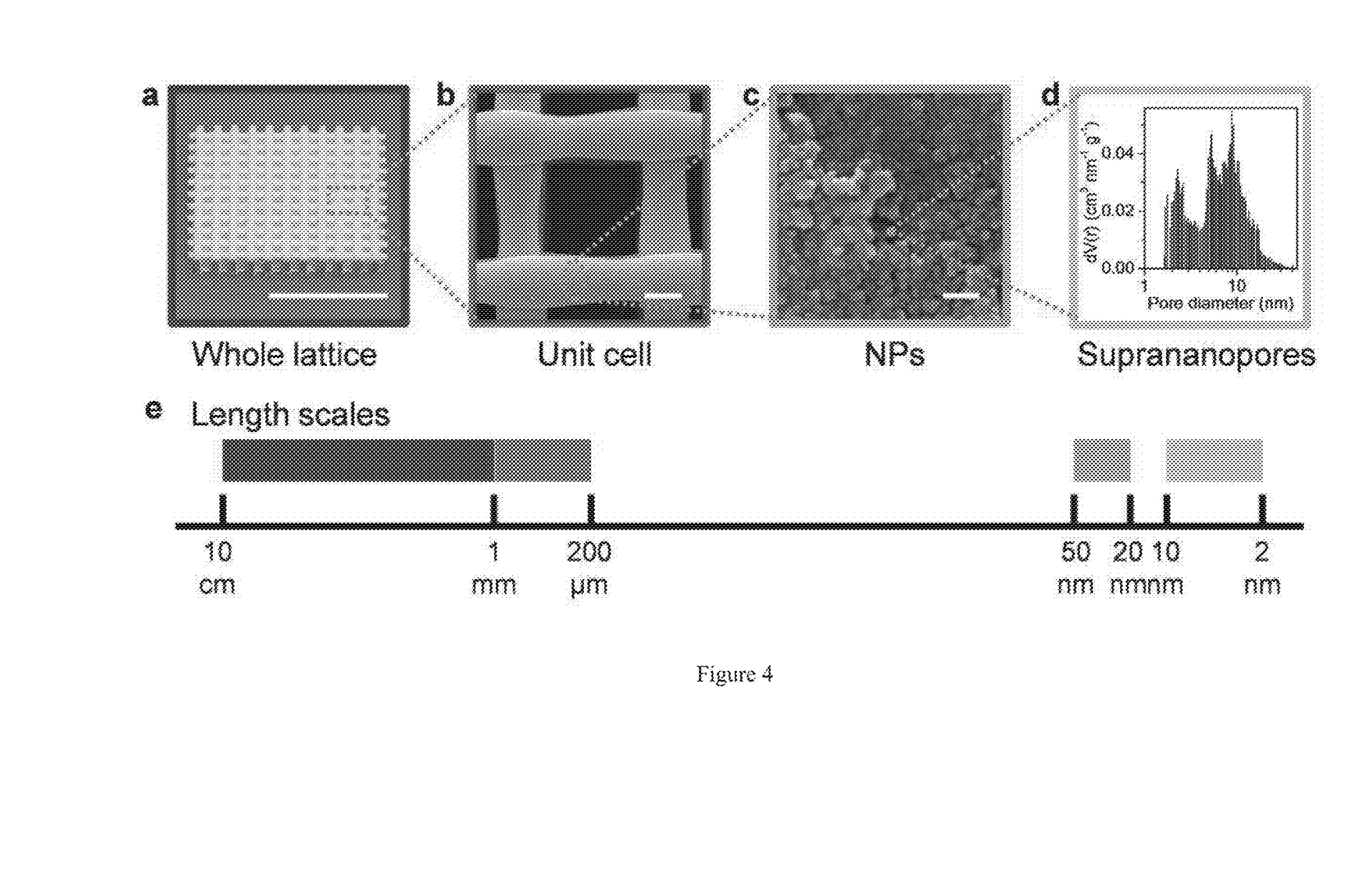
FIG. 4 shows an example of hierarchical nanostructures of second PDCs illustrated by digital photo (part a; scale bar, 5 mm), SEM image of the microlattice (part b; scale bar, 200 μm), SEM image of the cross-section (part c; scale bar, 100 nm), and pore size distribution (part d), with part e showing schematic representation of the relevant dimensions of such hierarchical ceramic nanostructures.

Use of a Scanning Electron Microscopy (SEM) technique reveals that the spatial resolution of the printed microstructures (FIG. 4a) for the samples are 200 µm (as seen in FIG. 4b), which is determined by a combination of the nozzle diameter and shrinkage during transformation.

In the cross section of resultant ceramic lattices, NPs with the diameter of 20-50 nm are observed (see FIG. 4c). The degradation of the PDMS matrix with well-distributed NPs yields porous ceramics with Brunauer-Emmett-Teller (BET) surface areas of 184 $m^2g^{-1}$ and 138 $m^2g^{-1}$ for the first and second PDCs, respectively (see FIG. 5).

Figure 5:
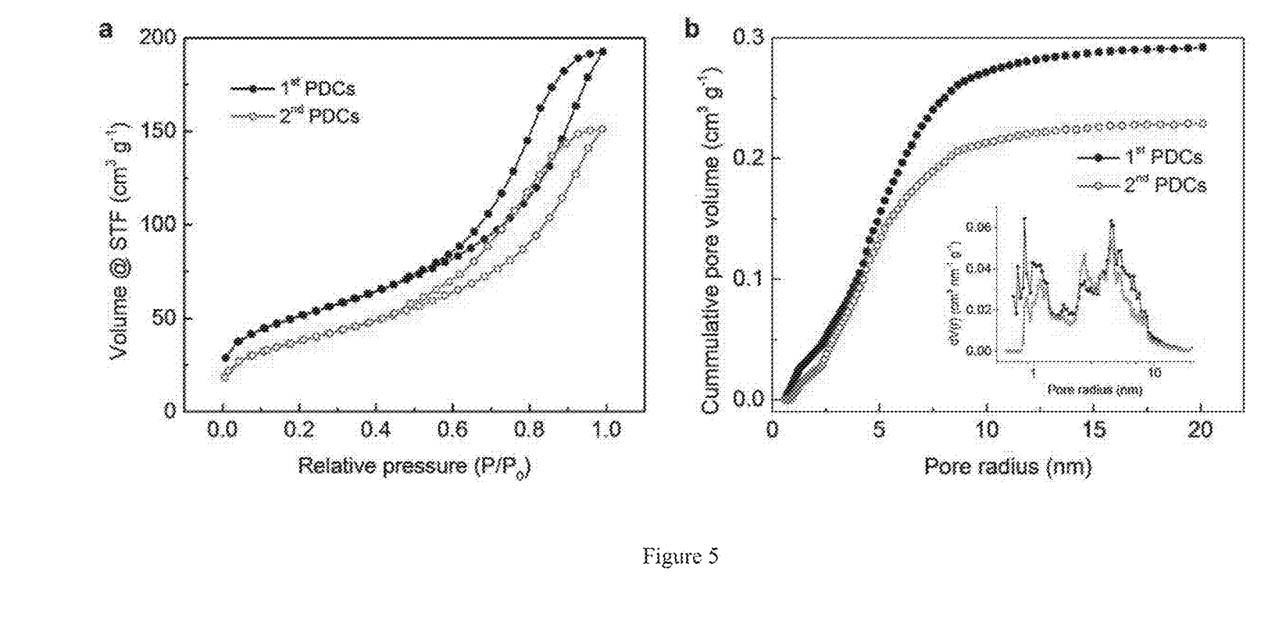
FIG. 5 shows an example of the porosity of PDCs (part a), $N_2$ adsorption/desorption isotherm of first and second PDCs (part b), wherein the inset shown in part b provides cumulative pore volume and pore size distribution of first and second PDCs.

The pore size distribution of PDCs indicated supranano-pores with a diameter of 2-10 nm (see FIG. 4d and FIG. 5). The supranano porous ceramics, integrated with printed microstructures, can provide high flux and desired pore accessibility, for example, in ceramic catalyst support.

The programmable structural hierarchy of the abovementioned ceramic nanostructures spans three orders of magnitude, from 200 µm to 10 cm (see FIG. 4e).

Figure 6:
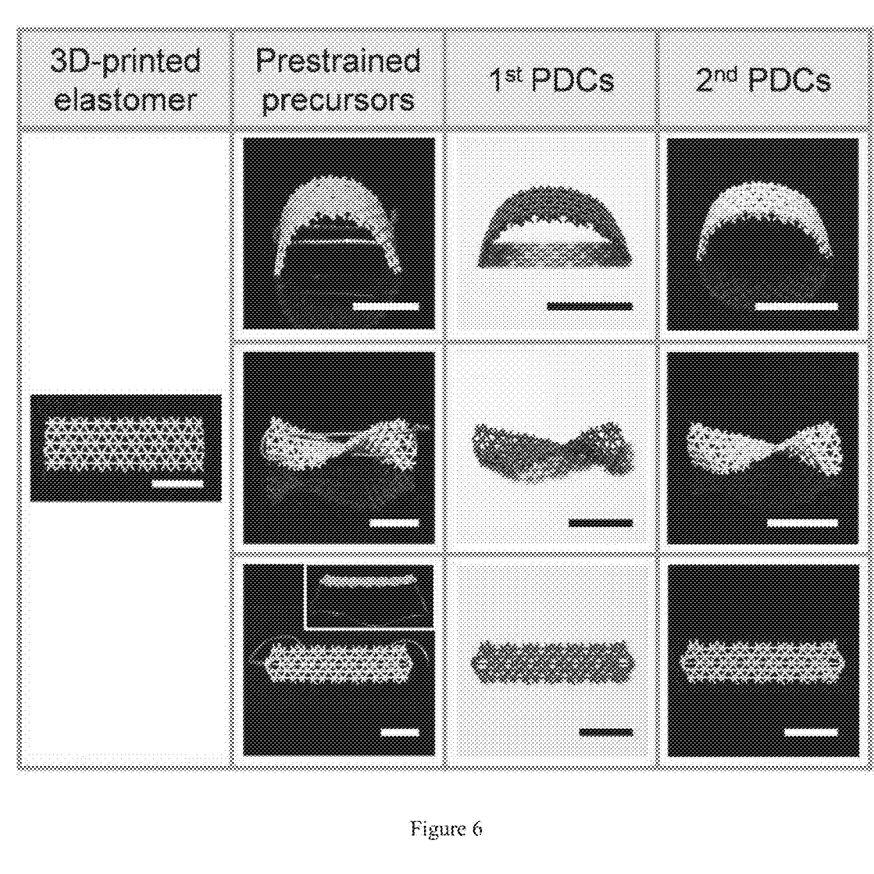
FIG. 6 shows the flexibility and stretchability of printed elastomer presented by bending, twisting and stretching.

The flexibility and stretchability of printed elastomer, demonstrated by some fundamental loading modes like bending, twisting and stretching, suggested possibilities for origami assembly (see FIG. 6).

Figure 7:
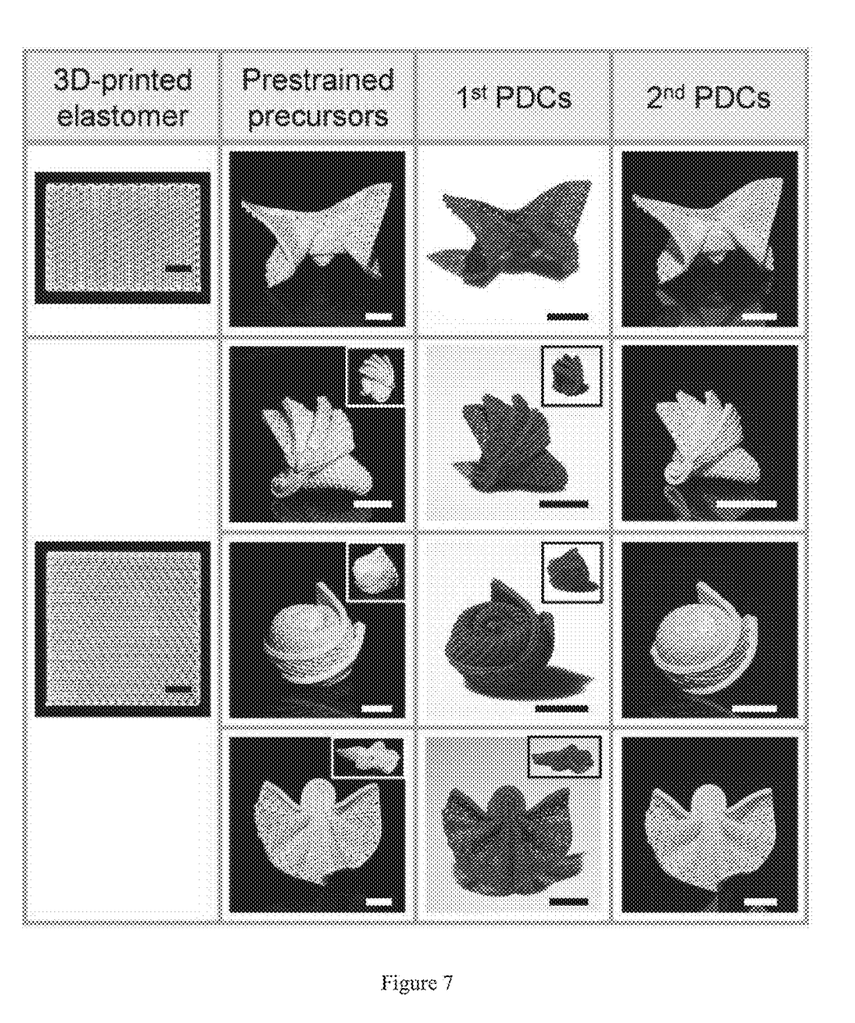
FIG. 7 shows representative ceramic origami objects mimicking a butterfly, the Sydney Opera House, a rose and a dress.

Representative ceramic origami structures with complex curvatures, mimicking a butterfly, the Sydney Opera House, a rose and a dress, were built from 3D-printed cuboid or cubic pre-strained precursors (FIG. 7). The 3D-printed elastomeric lattices undergo morphological transformation and are deterministically constrained by the metal wire, yielding 4D-printed ceramics.

The printed periodic local patterns in elastomeric lattices improve the foldability of global structures and guaranteed the programmability in locating constraints.

Figure 8:
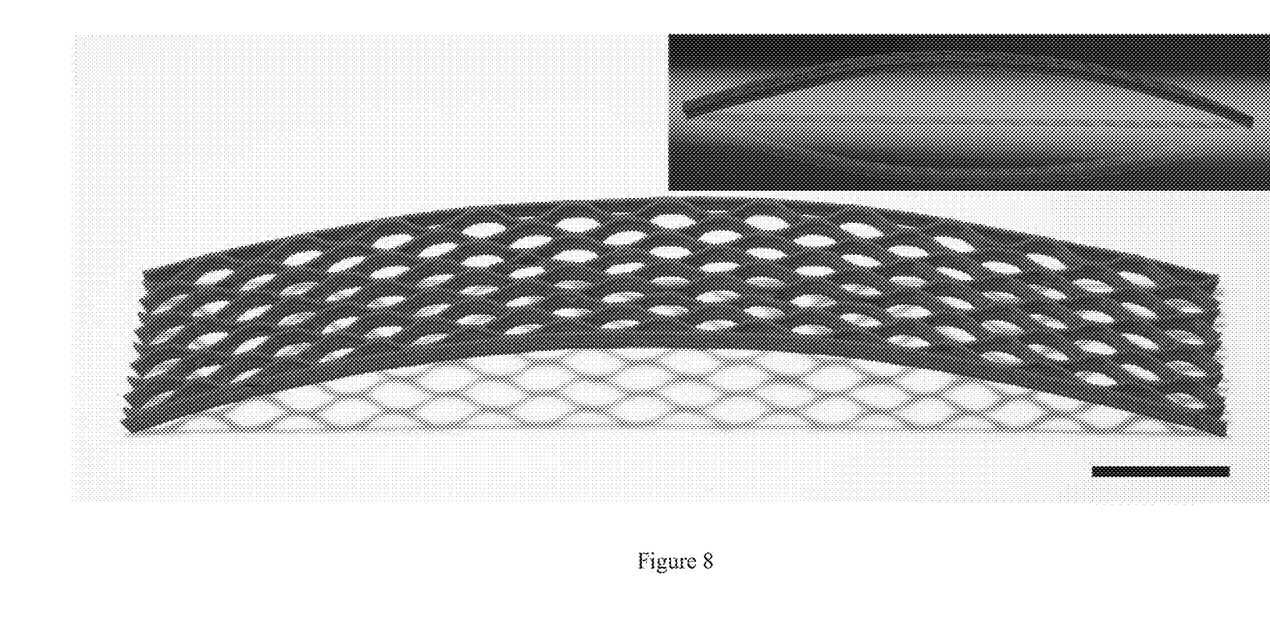
FIG. 8 shows a large-scale 4D-printed ceramic.

The scalability of this method is demonstrated by the curved ceramic honeycombs with a maximum dimension of nearly ten centimeters (FIG. 8). The equilibrium morphologies are determined by balancing bending and stretching energies, and such competition results in a thickness-dependent equilibrium state.

Figure 9:
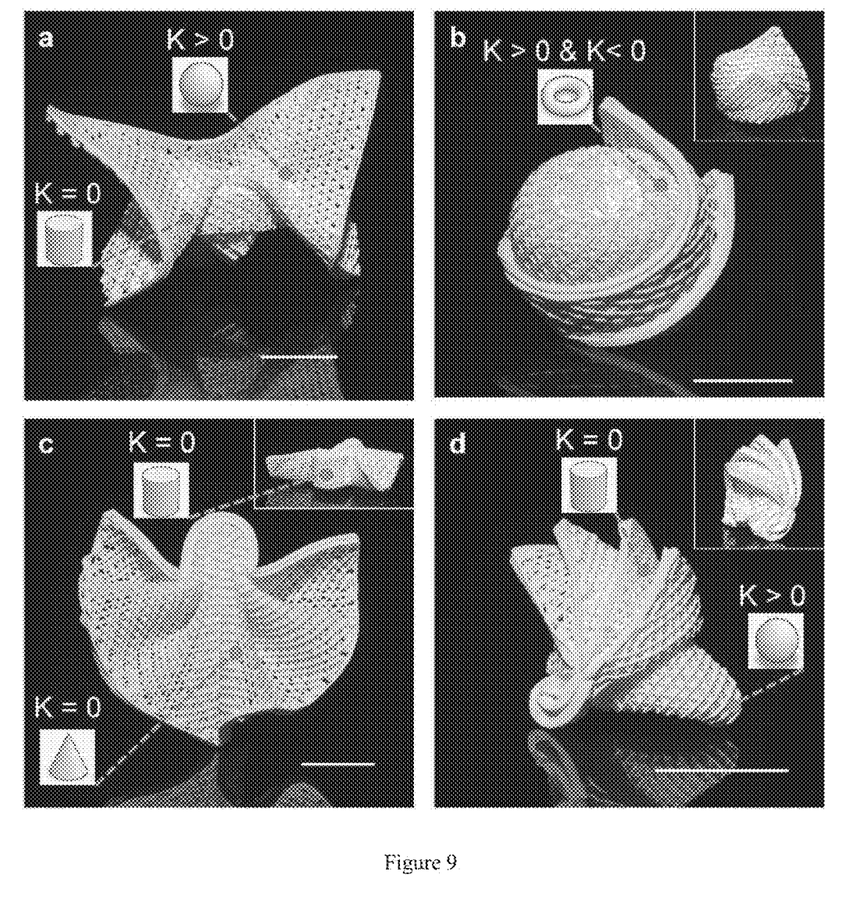
FIG. 9 shows complex 4D-printed ceramics with mixed Gaussian curvature (K) generated by DIW-origami-SCOP method, wherein parts a and d shows positive K (spherical caps) and zero K (cylinders) in 4D-printed ceramics, part b shows, Positive K (the outer region of the torus) and negative K (the inner region of the torus) in 4D-printed ceramics, and part c shows Zero K (cones and cylinders) in 4D-printed ceramics.

Based on Gauss's Theorema Egregium, the stretchability of the elastomer offers opportunities to building sophisticated structures with mixed Gaussian curvature by changing distances between the points on the surface. Typical zero Gaussian curvature, such as cylinders and cones, and positive Gaussian curvature like spherical caps were generated in resultant 4D-printed ceramics, as well as negative Gaussian curvature exhibited in the saddle-shaped inner region of the torus (see FIG. 9).

While prior art solutions have had difficulty printing complex structures directly with overhanging unsupported features and mixed Gaussian curvatures, the DIW-origami-SCOP method of the embodiment overcomes such limitations.

Figure 10:
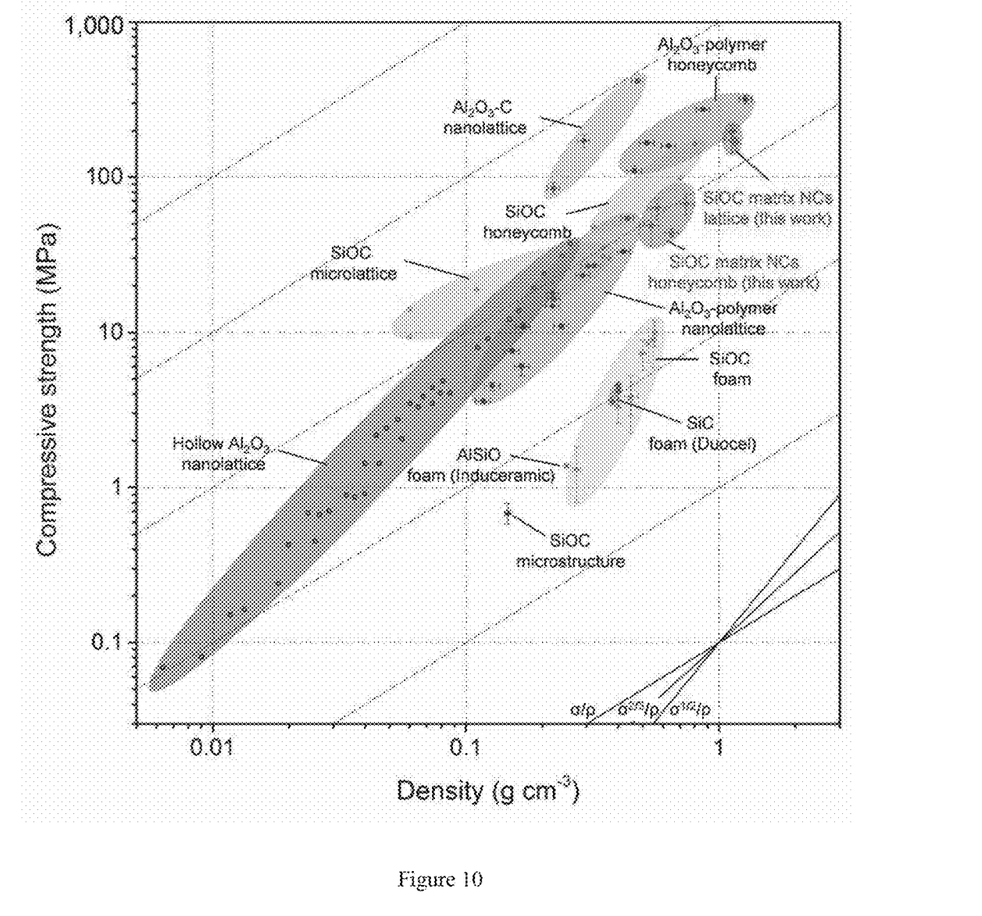
FIG. 10 shows compressive strength-density Ashby Chart. SiOC matrix NCs architectures with high specific compressive strength in this work (red stars), are compared with other ceramic structures as reported in the reference and commercial available SiC foam and AlSiO foam.
Figure 11:
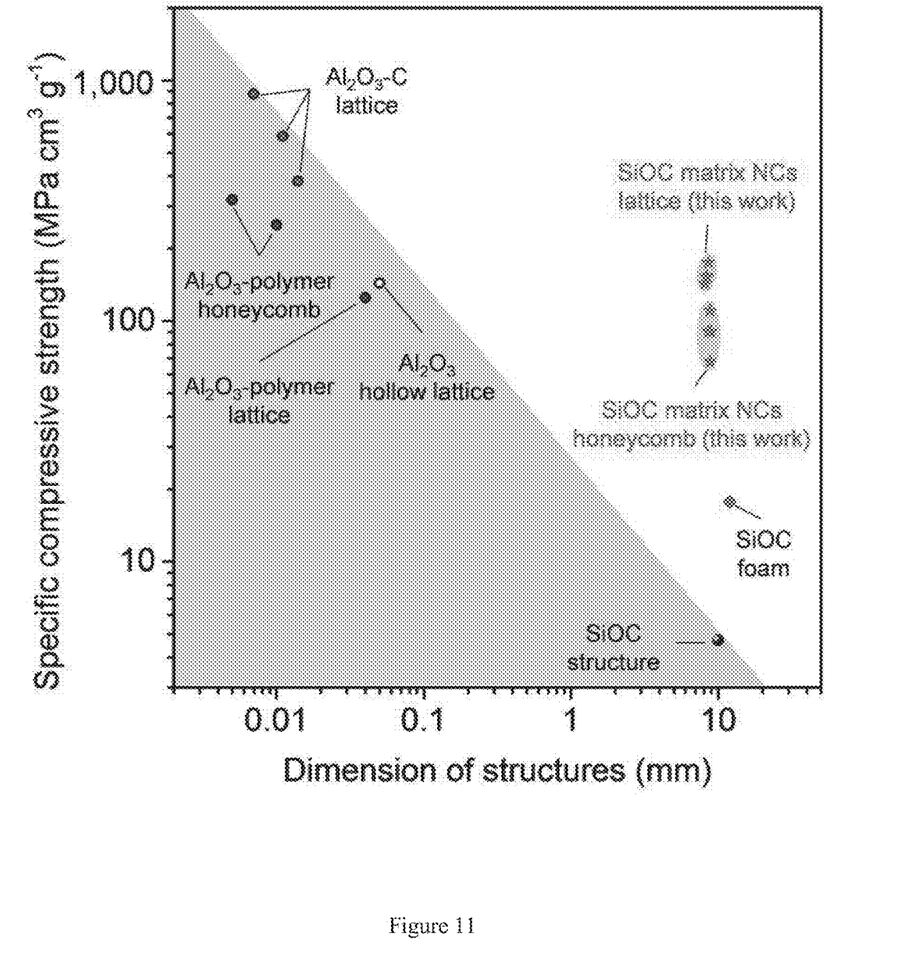
FIG. 11 shows strength-scalability synergy. Architectured PDCs with simultaneous high strength and large area; and FIG. 12A, FIG. 12B, FIG. 12C

Moreover, the use of kirigami assembly techniques can be integrated into the DIW-SCOP method as another powerful and customizable approach for 4D-printed ceramics. To characterize the mechanical robustness of these ceramic architectures, compression tests were performed on printed ceramic lattices and honeycombs, for both the first and second PDCs. The results are summarized in FIG. 10, FIG. 11, and in the compression test samples of Table 1 (below).

Figures 12A, 12B:
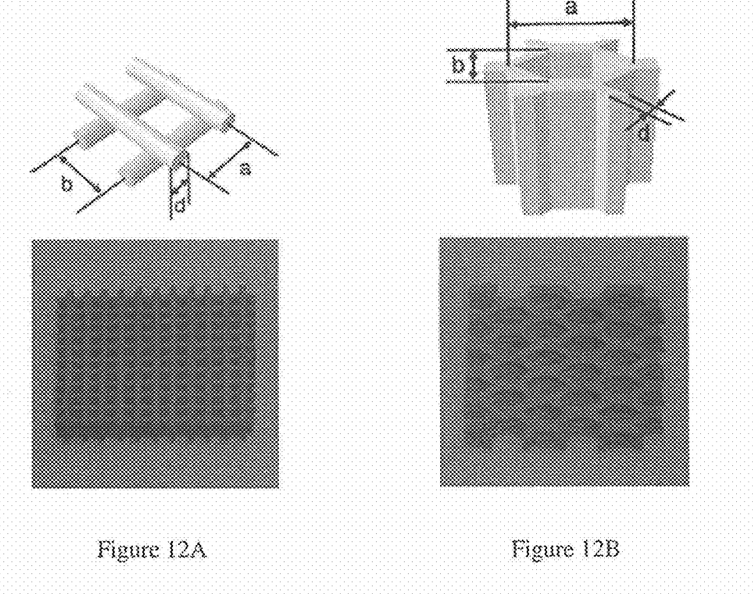

| Material | Atmosphere in pyrolysis | Architecture | Geometry | d (µm) | a (mm) | b (mm) | Dimensions of the precursor* (mm) | Mass of the precursor (g) | Dimensions of the sample (mm) | Mass of the sample (g) | Density (g cm$^{-3}$) | Compressive strength (MPa) |
|---|---|---|---|---|---|---|---|---|---|---|---|---|
| 1$^{st}$ PDCs | Vacuum | Lattice | See FIG. 12A | 210 | 0.64 | 0.64 | 10.40 × 10.38 × 1.59 | 0.162 | 8.40 × 8.40 × 1.30 | 0.108 | 1.177 | 205.8 |
| 1$^{st}$ PDCs | Vacuum | Lattice | | 210 | 0.64 | 0.64 | 10.32 × 10.32 × 1.52 | 0.151 | 8.33 × 8.33 × 1.25 | 0.099 | 1.141 | 160.4 |
| 1$^{st}$ PDCs | Vacuum | Lattice | | 210 | 0.64 | 0.64 | 10.50 × 10.50 × 1.54 | 0.136 | 8.44 × 8.42 × 1.21 | 0.089 | 1.035 | 150.2 |
| 1$^{st}$ PDCs | Argon | Lattice | | 210 | 0.64 | 0.64 | 10.72 × 10.61 × 1.60 | 0.173 | 8.62 × 8.52 × 1.31 | 0.112 | 1.164 | 207.0 |
| 1$^{st}$ PDCs | Argon | Lattice | | 210 | 0.64 | 0.64 | 10.72 × 10.59 × 1.51 | 0.155 | 8.57 × 8.49 × 1.21 | 0.100 | 1.135 | 211.2 |
| 1$^{st}$ PDCs | Argon | Lattice | | 210 | 0.64 | 0.64 | 10.70 × 10.58 × 1.46 | 0.148 | 8.62 × 8.42 × 1.20 | 0.094 | 1.079 | 174.0 |
| 1$^{st}$ PDCs | Argon | Honeycomb | See FIG. 12B | 210 | 2.25 | 1.30 | 11.02 × 10.25 × 1.93 | 0.086 | 8.96 × 8.30 × 1.55 | 0.057 | 0.494 | 34.2 |
| 1$^{st}$ PDCs | Argon | Honeycomb | | 210 | 2.25 | 1.30 | 11.06 × 10.21 × 1.66 | 0.088 | 8.85 × 8.28 × 1.36 | 0.057 | 0.572 | 53.9 |
| 1$^{st}$ PDCs | Argon | Honeycomb | | 210 | 2.25 | 1.30 | 11.20 × 10.49 × 1.58 | 0.080 | 8.98 × 8.54 × 1.25 | 0.052 | 0.542 | 58.8 |

-continued

Figures 12C, 12D:
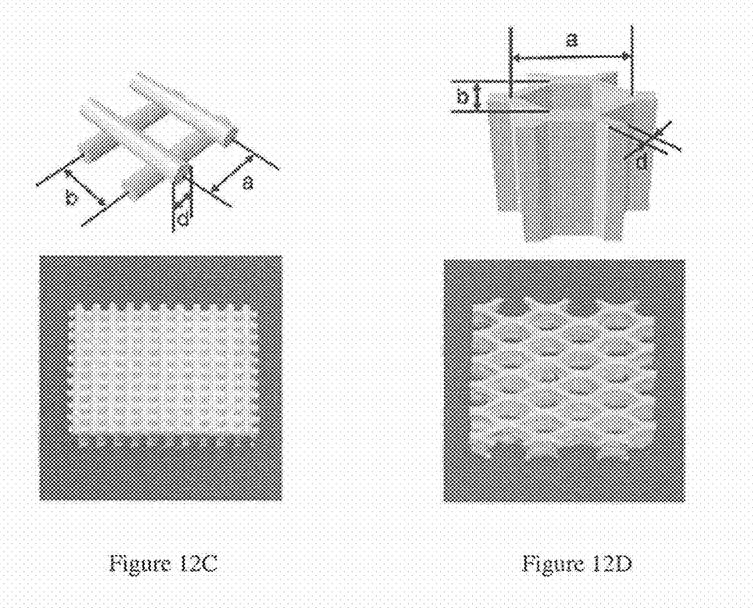

| Material | Atmosphere in pyrolysis | Architecture | Geometry | d (μm) | a (mm) | b (mm) | Dimensions of the precursor* (mm) | Mass of the precursor (g) | Dimensions of the sample (mm) | Mass of the sample (g) | Density (g cm$^{-3}$) | Compressive strength (MPa) |
|---|---|---|---|---|---|---|---|---|---|---|---|---|
| 1$^{st}$ PDCs | Argon | Honeycomb | | 210 | 2.25 | 1.30 | 10.95 × 10.29 × 2.30 | 0.135 | 8.90 × 8.39 × 1.83 | 0.087 | 0.637 | 41.6 |
| 1$^{st}$ PDCs | Argon | Honeycomb | | 210 | 2.25 | 1.30 | 11.13 × 10.02 × 2.12 | 0.116 | 8.92 × 8.10 × 1.68 | 0.075 | 0.618 | 46.8 |
| 1$^{st}$ PDCs | Argon | Honeycomb | | 210 | 2.25 | 1.30 | 10.86 × 10.07 × 2.38 | 0.145 | 8.74 × 8.18 × 1.93 | 0.095 | 0.688 | 42.9 |
| 2$^{nd}$ PDCs | Vacuum | Lattice | See FIG. 12C | 205 | 0.63 | 0.63 | 8.25 × 8.25 × 1.26 | 0.095 | 8.01 × 8.01 × 1.21 | 0.092 | 1.185 | 172.2 |
| 2$^{nd}$ PDCs | Vacuum | Lattice | | 205 | 0.63 | 0.63 | 8.40 × 8.34 × 1.23 | 0.093 | 8.11 × 8.24 × 1.18 | 0.090 | 1.141 | 150.7 |
| 2$^{nd}$ PDCs | Vacuum | Lattice | | 205 | 0.63 | 0.63 | 8.38 × 8.42 × 1.27 | 0.097 | 8.20 × 8.18 × 1.22 | 0.095 | 1.164 | 175.2 |
| 2$^{nd}$ PDCs | Argon | Lattice | | 205 | 0.63 | 0.63 | 8.64 × 8.51 × 1.26 | 0.099 | 8.43 × 8.31 × 1.23 | 0.098 | 1.137 | 169.3 |
| 2$^{nd}$ PDCs | Argon | Lattice | | 205 | 0.63 | 0.63 | 8.59 × 8.51 × 1.24 | 0.101 | 8.40 × 8.30 × 1.22 | 0.100 | 1.176 | 182.9 |
| 2$^{nd}$ PDCs | Argon | Lattice | | 205 | 0.63 | 0.63 | 8.57 × 8.53 × 1.16 | 0.091 | 8.40 × 8.34 × 1.15 | 0.090 | 1.117 | 169.2 |
| 2$^{nd}$ PDCs | Argon | Honeycomb | See FIG. 12D | 205 | 2.20 | 1.27 | 8.89 × 8.24 × 1.29 | 0.056 | 8.71 × 8.15 × 1.25 | 0.054 | 0.609 | 74.3 |
| 2$^{nd}$ PDCs | Argon | Honeycomb | | 205 | 2.20 | 1.27 | 9.05 × 8.53 × 1.35 | 0.053 | 8.90 × 8.31 × 1.33 | 0.051 | 0.518 | 57.7 |
| 2$^{nd}$ PDCs | Argon | Honeycomb | | 205 | 2.20 | 1.27 | 9.02 × 8.52 × 1.34 | 0.060 | 8.60 × 8.30 × 1.33 | 0.057 | 0.587 | 57.3 |
| 2$^{nd}$ PDCs | Argon | Honeycomb | | 205 | 2.20 | 1.27 | 8.84 × 8.14 × 1.71 | 0.078 | 8.61 × 7.92 × 1.66 | 0.076 | 0.671 | 55.9 |
| 2$^{nd}$ PDCs | Argon | Honeycomb | | 205 | 2.20 | 1.27 | 8.84 × 8.36 × 1.76 | 0.095 | 8.56 × 8.12 × 1.71 | 0.094 | 0.791 | 75.1 |
| 2$^{nd}$ PDCs | Argon | Honeycomb | | 205 | 2.20 | 1.27 | 8.88 × 8.31 × 1.79 | 0.093 | 8.60 × 8.05 × 1.74 | 0.092 | 0.764 | 70.7 |

*Precursor: PDMS NCs for 1$^{st}$ PDCs; 1$^{st}$ PDCs for 2$^{nd}$ PDCs

The lattice exhibits a higher strength-to-density ratio than the honey comb, and a compressive strength of 211 MPa was achieved on first PDCs of the lattice structure at 1.1 gcm$^{-3}$.

ADVANTAGES AND INDUSTRIAL APPLICABILITY

The embodiments and broader invention described herein provide a number of advantages and have broad industrial applicability.

Firstly, the techniques and materials utilised and developed as part of the embodiments described herein allow for the creation of objects with a high geometrical complexity, including mixed Gaussian curvature.

Secondly, the objects produced have a high mechanical robustness, approximately 10 times higher than conventional SiOC foam in specific compressive strength tests.

Thirdly, there is a strength-scalability synergy demonstrated, meaning that the techniques and materials described herein have great potential for industrial scale production.

Fourthly, the techniques and materials utilised and developed as part of the embodiments are cost effective and can be printed in a cost efficient manner.

Fifthly, all the materials and techniques used in the embodiments are based on commercially available and open-end feedstock systems, further showing that the embodiments described herein have commercial potential and industrial applicability.

Lastly, in a more general sense, the abovementioned advantages provide the possibility that the materials and techniques of the embodiments can be utilized in many structural applications including autonomous morphing ceramic composites, aerospace propulsion components, and high-temperature microelectromechanical systems.

In more detail, and by way of example, the suprananoporous ceramics, integrated with printed microstructures, can provide high flux and desired pore accessibility in, for example, ceramic catalyst support.

In addition, the added use of programmable local heating on 4D-printed elastomers provides a way to fabricate globally tough ceramic-organic architectures. Such pre-strained elastomer-derived ceramic origami based on additive manufacturing technique find use in aerospace propulsion, shape memory ceramics and bio-inspired tough ceramic-organic hybrid materials.

The invention claimed is:

1. A method of constructing a 4D-printed ceramic object, the method comprising:
    extruding inks including particles and a polymeric ceramic precursor through a nozzle to deposit the inks on a heating plate, whereby a 3D-printed elastomeric object is formed on the heating plate, folding the 3D-printed elastomeric object into a complex structure to form a 4D-printed pre-strained elastomeric object, and converting the 4D-printed elastomeric pre-strained object into a 4D-printed ceramic object.

2. The method of claim 1, wherein the particles are zirconium dioxide nanoparticles.

3. The method of claim 1, wherein the polymeric ceramic precursor is poly(dimethyl siloxane).

4. The method of claim 1, wherein the temperature of the heating plate is in the range of from about 30° C. to about 400° C.

5. The method of claim 1, wherein the folding of the 3D-printed elastomeric object is achieved by metal wires.

6. The method of claim 1, wherein the step of converting occurs via pyrolysis in a vacuum or under an inert atmosphere.

7. The method of claim 6, wherein the heating temperature of the step of converting is 400° C. to 2000° C.

8. The method of claim 6, wherein polymer structures undergo limited and uniform shrinkage during the step of converting and wherein the 4D-printed ceramic object has substantially the same shape as the 4D-printed elastomeric pre-strained object.

9. The method of claim 1, wherein the 4D-printed ceramic object has a Gaussian curvature.

10. The method of claim 1, wherein the 4D-printed ceramic object has a dimension of 100 μm or more.

11. The method of claim 1, wherein the inks are formed from a homogenous distribution of the particles in the polymeric ceramic precursor and wherein the weight percentage of the particles in the inks is in the range of from about 1% to about 90% and the weight percentage of the polymeric ceramic precursor in the inks is in the range of from about 10% to about 99%.

12. The method of claim 1, wherein the particles are characterized by an average diameter of about 100 μm or less.

13. The method of claim 1, wherein the particles are uniformly distributed powders.

14. The method of claim 1, wherein the 4D-printed pre-strained elastomer object is locally or partially heated in order to achieve a ceramic-organic structure.

15. The method of claim 1, wherein the folding of the 3D-printed elastomeric object is achieved by use of at least one of metal wires, prestretch devices, metal plates, polymer wires, polymer plates, carbon wires, carbon plates, silicon wires, silicon plates, shape memory alloys and shape memory polymers.

16. The method of claim 15, wherein, during the step of converting, the pre-strain is programmed by robotics or shape memory alloy or thermal expansion or relaxation of residual stress or laser cutting of ligaments or combinations thereof.

17. The method of claim 1, wherein the polymeric ceramic precursor includes at least one of polysiloxanes, polysilsesquioxanes, polycarbosiloxanes, polycarbosilanes, polysilylcarbodiimides, polysilsesquicarbodiimides, polysilazanes and polysilsesquiazanes.

18. The method of claim 1, wherein the particles include at least one of zirconium dioxide particles, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles and refractory materials.

* * * * *